3,597,232
STARCH-CONTAINING FOOD COMPOSITIONS WITH FATTY ACYL POLYPHOSPHATE GEL MODIFIERS
Ralph B. Fearing, Bardonia, and John C. Sourby, Hawthorne, N.Y., assignors to Stauffer Chemical Company
No Drawing. Filed Apr. 24, 1968, Ser. No. 723,926
Int. Cl. A23l 1/14, 1/00
U.S. Cl. 99—139                                                    1 Claim

ABSTRACT OF THE DISCLOSURE

A phosphate food additive composition for combining with foodstuff containing at least starch and water having the formula:

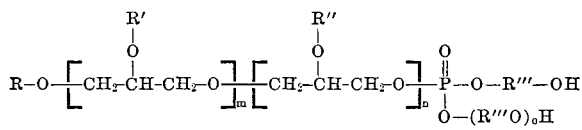

wherein R can be hydrogen or a long chain fatty acyl group having between 7 and 50 carbon atoms and R' can be hydrogen or a long chain fatty acyl group having from 7 to 50 carbon atoms, R'' can be hydrogen or a long chain fatty acyl group having from 7 to 50 carbon atoms, R''' is an alkylene group having at least 2 carbon atoms but less than 10, but when R'' is a hydrogen atom at least R or R' must be a fatty acyl group, $m$ can be an integer between 1 and 10, $n$ can be an integer between 1 and 10, $o$ can be an integer between 1 and 10.

BACKGROUND OF THE INVENTION

It is well known to use starch in some foods to provide gelling and texturing properties. Starch is used primarily in sauces, puddings, pie fillings and the like. The viscosity of these foods will vary over a wide range and will depend primarily upon the amount of starch initially provided therein.

Certain problems have been encountered in the use of these foodstuffs, in that the viscosity thereof cannot be controlled. This is due primarily to the fact that water will separate from the solid material during storage at a moderately cool temperature. With this loss of water upon storage, the gelling properties and also the viscosity properties of the foodstuffs will be materially altered. This problem is particularly acute in the frozen food industry, wherein the foodstuffs must be thawed prior to use. During this thawing operation, the water phase will separate which will alter the texture and gelling properties of the foodstuff.

BRIEF DESCRIPTION OF THE PRESENT INVENTION

It has been discovered that the viscous properties of foodstuffs containing starch and water can be considerably improved by adding thereto a predetermined amount of a phosphate composition having the following formula:

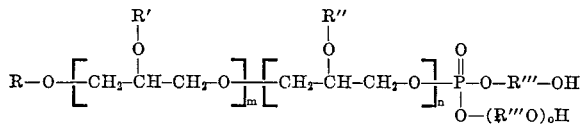

wherein R can be hydrogen or a long chain fatty acyl group having between 7 and 50 carbon atoms and R' can be hydrogen or a long chain fatty acyl group having from 7 to 50 carbon atoms, R'' can be hydrogen or a long chain fatty acyl group having from 7 to 50 carbon atoms, R''' is an alkylene group having at least 2 carbon atoms but less than 10, but when R'' is a hydrogen atom at least R or R' must be a fatty acyl group, $m$ can be an integer between 1 and 10, $n$ can be an integer between 1 and 10, $o$ can be an integer between 1 and 10.

DETAILED DESCRIPTION OF THE INVENTION

In the practice of the present invention, the phosphates of the present invention are formulated by reacting a long chain fatty acid di or polyglyceryl ester such as diglyceryl mono-palmitate, triglyceryl distearate, diglyceryl mono-oleate, and the like with polyphosphoric acid such as pyrophosphoric acid to produce a fatty acid ester of di or polyglycerol monophosphate. Some diphosphate or even polyphosphate may be produced depending on the number of free OH groups per molecule or in other words OH groups left unesterified by the fatty acid. This material is then treated with alkylene oxide such as ethylene, propylene, butylene oxides to produce the oxyalkylated product. More than 2 moles of alkylene oxide per mole of fatty acid ester of the di or polyglyceryl mono- and diphosphate are used.

The fatty acid esters that can be used to start the reaction of the present invention can be selected from the group consisting of condensed glyceryl derivatives of palmitate, stearate, oleate, laurate, myristate and mixtures thereof.

It has been found and practiced that from about 0.1 to 2% by weight can be added to the foodstuff and phase separation of the water therein will be essentially eliminated or considerably reduced.

In order to illustrate the merits of the present invention, the following examples are provided.

EXAMPLE 1

A sample of transesterified diglyceryl monopalmitate in an amount of 570 grams was melted at 80° C. To this molten product was added 213.7 grams of molten pyrophosphoric acid by increments. After two hours at 85°, the reaction mixture was diluted with 800 milliliters of benzene. This left an insoluble residue, 203 grams, which was washed several times with benzene. The total benzene layer remained homogeneous. A sample of this product indicated 85% phosphorylation had been achieved. Thereafter, ethylene oxide was bubbled into this product at 52° C. for about 4 or 5 hours. No condensate appeared in a Dry Ice cooled trap on the effluent tube indicating total absorption. The ethylene oxide introduction was continued until condensate appeared in the trap. The benzene was then stripped. Analysis of the end product indicated a yield of 764 grams of polyoxyethylene palmityl polyglycerol phosphate.

EXAMPLE 2

A sample of 99 grams of commercial palmityl diglycerol was intermixed in the solid state with 45 grams of pyrophosphoric acid. The two solids were then melted together at a temperature reaching about 110° C. The temperature was then reduced to 85° and maintained for one hour. Thereafter, 500 milliliters of benzene was introduced and a clear phase appeared. No inorganic phosphoric acid separated. The benzene was diluted with hexane with no phase separation. The solution was then alkoxylated by bubbling ethylene oxide therethrough at room temperature. After four hours a benzene ethylene oxide mixture began to collect in a cold trap used at the effluent of the reaction chamber indicating that the ethylene oxide had saturated the starting material. An analysis of this material indicated 153 grams of polyoxyethylene palmitoyl polydiglycerol phosphate.

EXAMPLE 3

A starch base was prepared by admixing together 94% by weight water, 5% starch and 1% by weight of the material of Example 1. A second starch base was prepared by admixing together 95% by weight water with 5% starch. Each starch base was heated to 95° C. and then cooled to 25° C. The viscosity of each base was measured with a Brookfield viscometer. The second formation without the material of Example 1 had a viscosity of 7360 centipoise, while the other base had a viscosity of 3360 centipoise. The samples were then stored in a refrigerator at 5° C. After three days storage, a total amount of 3 to 5% by weight of the water in the formation without the material of Example 1 had separated therefrom. No water separated from the formulation containing 1% of the material of Example 1.

What is claimed is:
1. A food composition containing starch, as a gelling and texturizing agent, water and a phosphate food additive having the formula:

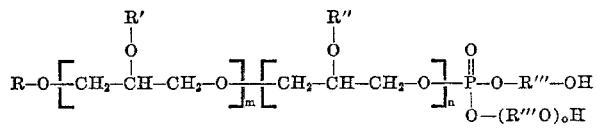

wherein R can be hydrogen or a long chain fatty acyl group having between 7 and 50 carbon atoms and R' can be hydrogen or a long chain fatty acyl group having from 7 to 50 carbon atoms, R" can be hydrogen or a long chain fatty acyl group having from 7 to 50 carbon atoms, R''' is an alkylene group having at least 2 carbon atoms but less than 10, but when R" is a hydrogen atom at least R or R' must be a fatty acyl group, $m$ can be an integer between 1 and 10, $n$ can be an integer between 1 and 10, $o$ can be an integer between 1 and 10, said phosphate food additive composition being present in an amount of from about 0.1 to about 2% by weight of the food composition, whereby upon storage, phase separation of water will be essentially eliminated.

References Cited
UNITED STATES PATENTS 3,004,056 10/1961 Nunn, Jr. et al. _____ 260—403
3,208,857 9/1965 Howard et al. _____ 260—403X
3,248,229 4/1966 Pader et al. _____ 99—139

RAYMOND N. JONES, Primary Examiner

J. M. HUNTER, Assistant Examiner

U.S. Cl. X.R.

99—144